Dec. 12, 1933.  C. J. NASH  1,938,856
SHOCK ABSORBER UNIT
Filed March 10, 1928   2 Sheets-Sheet 1
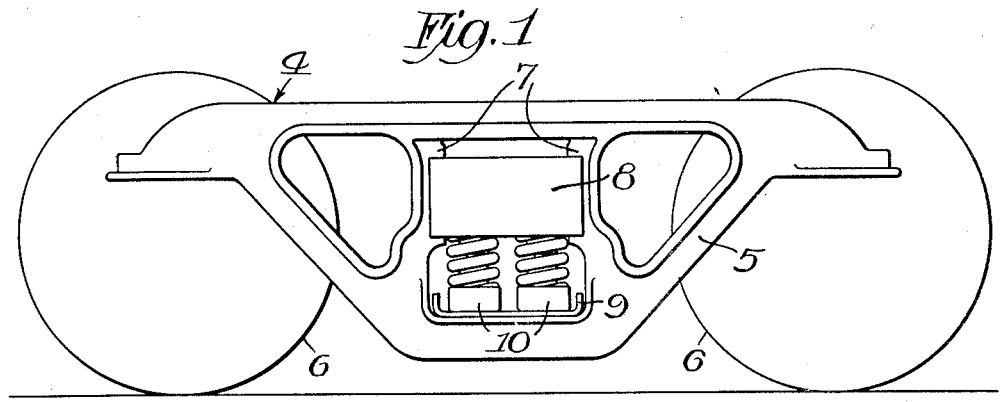
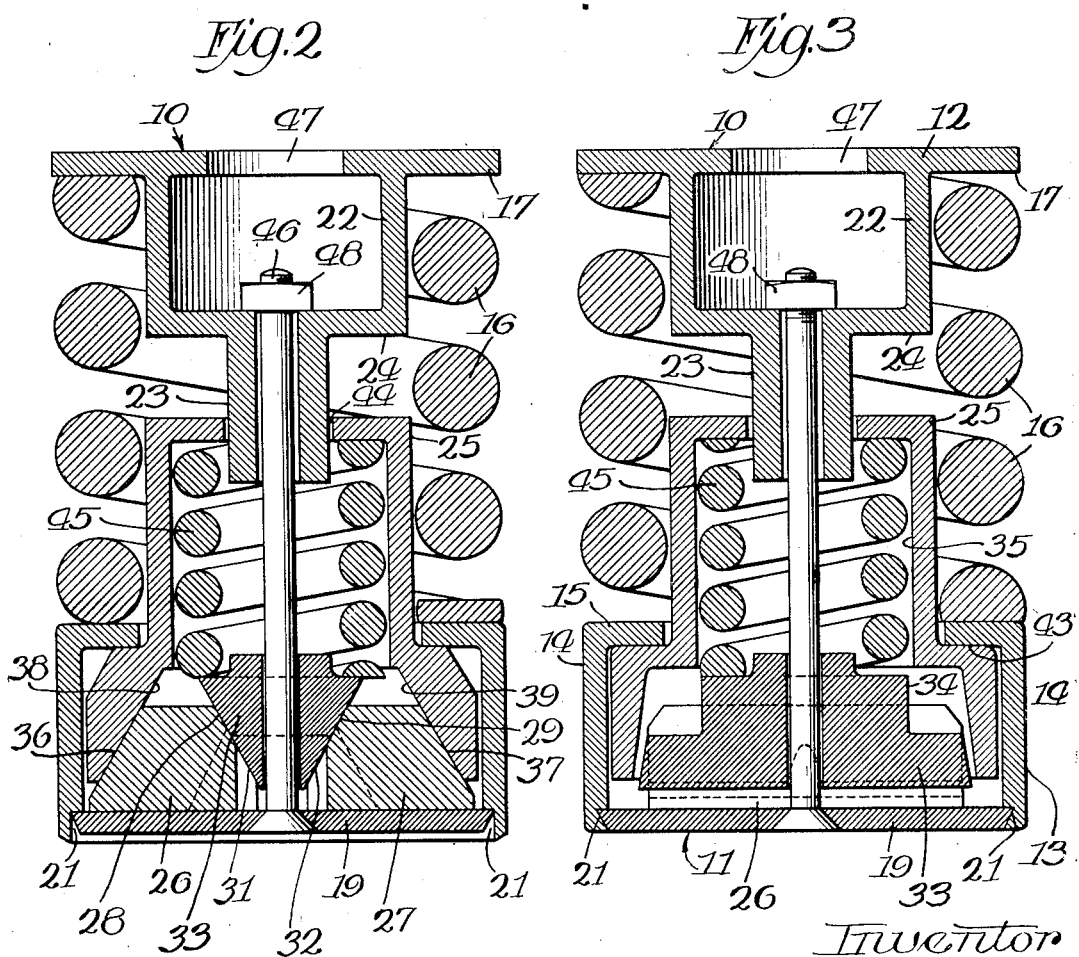
Inventor
Charles J. Nash
By Gillson, Mann & Cox Attys.

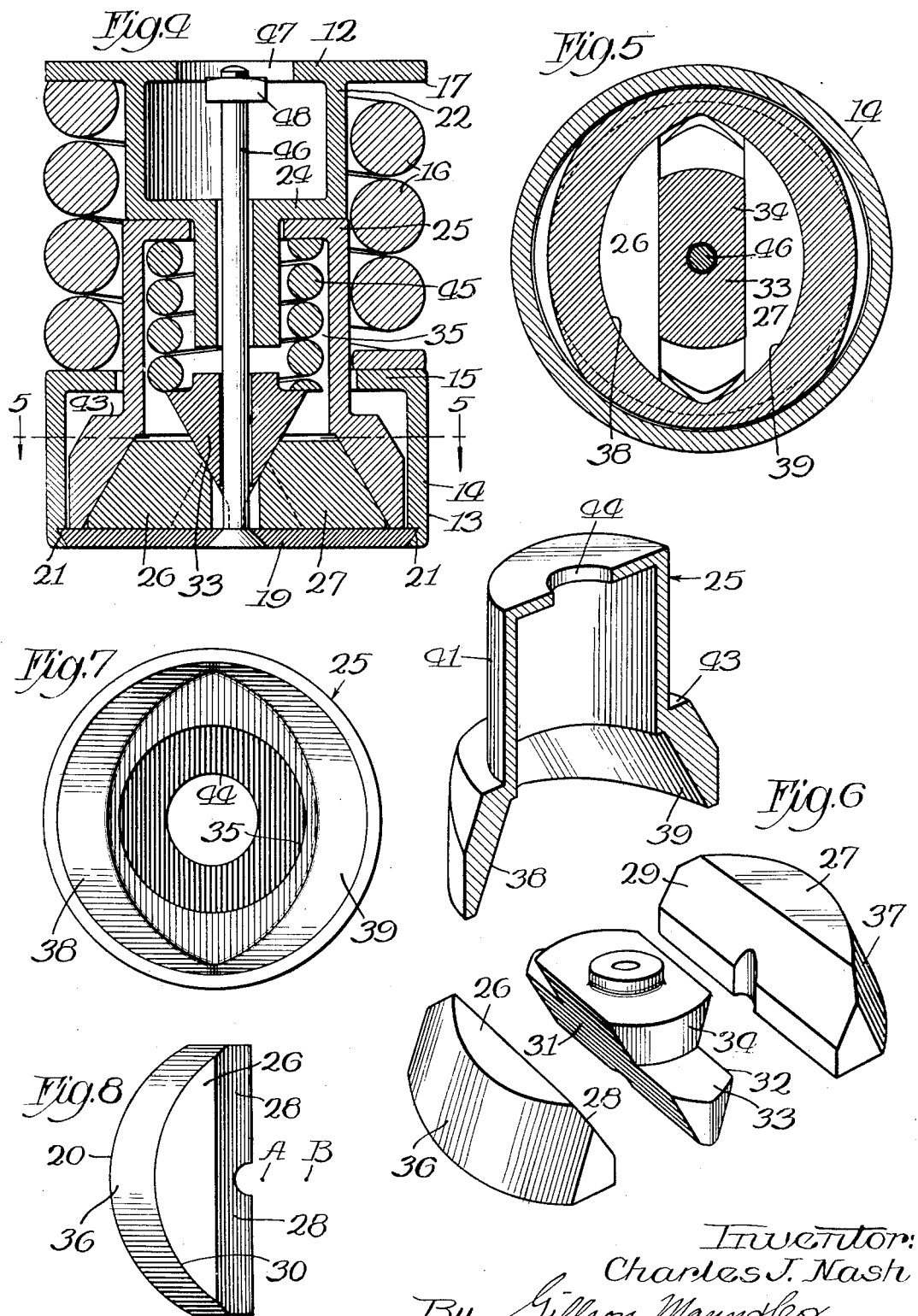

Patented Dec. 12, 1933

1,938,856

UNITED STATES PATENT OFFICE 1,938,856

SHOCK ABSORBER UNIT

Charles J. Nash, Chicago, Ill., assignor to Universal Draft Gear Attachment Co., a corporation of Illinois Application March 10, 1928. Serial No. 260,782

5 Claims. (Cl. 267—9)

This invention relates to combined shock absorber and resilient devices and more particularly to resilient supporting units for railway cars.

The principal object of the invention is the provision of a combined shock absorber and resilient unit that is so constructed that when employed on a railway car, it will resiliently support said car under normal conditions and will yieldingly resist the undue vertical vibration or oscillation of the car under abnormal conditions.

Another object of the invention is the provision of a combined spring and shock absorber unit that is so constructed that it will resiliently support a load and permit a limited amount of vertical movement of the same, but will resist undue vibration of the load by a system of friction elements which are brought into action after the main supporting spring has been compressed a predetermined amount.

A still further object of the invention is the provision of a combined spring and shock absorbing unit that has substantially the same dimensions as the conventional bolster coil spring whereby the latter may be replaced with the resilient unit herein disclosed without necessitating the remodeling of the car truck side frame.

Another object of the invention is the provision of a new and improved car bolster supporting unit that is cheap to manufacture, efficient in operation, easily assembled, rugged in construction and that may be readily substituted for the springs now in use.

Other and further objects and advantages of the invention will appear from the following description taken in connection with the accompanying drawings, in which Fig. 1 is a side elevation of a railway car truck shown more or less diagrammatically and showing the invention in position thereon;

Fig. 2 is a vertical section of the combined resilient and shock absorbing unit;

Fig. 3 is a similar view taken at right angles from that shown in Fig. 2;

Fig. 4 is a figure similar to that shown in Fig. 2, but showing the unit in compressed position;

Fig. 5 is a section on the line 5—5 of Fig. 4;

Fig. 6 is an exploded view of the friction system and showing the thrust member in vertical section;

Fig. 7 is a bottom plan view of the thrust member; and

Fig. 8 is a top plan view of one of the wedge members.

It is common practice to support railway cars from the trucks by interposing coil springs between the car supporting bolster and the side frame of the truck. The car is resiliently supported in this manner but there is no means for preventing undue vertical vibration or oscillation of the car. If the car is free to vibrate vertically under heavy load, the springs are likely to go solid under excessive vibration, in which event the impact may fracture or break the side frame thereby possibly causing a wreck of the train or at least serious injury to the same. Furthermore, excessive compression of the springs during vertical oscillation or vibration of the car will cause excessive rebound which in turn is likely to lift the wheels clear of the track with the consequent possible derailment of the truck or car.

The present invention seeks to eliminate these difficulties by providing combined resilient and shock absorber units that will frictionally resist undue vibration but which is so constructed that it will resiliently support the car without utilizing the frictional means until the unit has been compressed beyond a predetermined amount.

Referring now to Fig. 1 of the drawings, the reference character 4 designates a railway car truck. The side frame is shown at 5 and the supporting wheels are indicated at 6. The side frame 5 is provided with the usual columns 7 between which the end of the bolster 8 is mounted and is free to slide vertically. The usual spring plank is shown at 9 on which the combined spring and shock absorber units 10 are mounted in the usual manner.

In the form of the device selected to illustrate one embodiment of the invention, the combined resilient and shock absorber unit comprises what for convenience of description will be termed a lower base or head 11 and an upper base, head or supporting member 12. The lower base member 11 comprises a housing or casing 13 having a circular side wall 14 and a top wall 15. The top wall constitutes a seat for the main supporting spring 16 which is interposed between the lower base and a flange 17 on the upper base 12. The top wall of the lower base is provided with an axial opening through which the thrust member of the shock absorbing means extends as will presently appear.

The housing 13 is preferably open at its lower end to permit the insertion of the friction elements. A closure 19 is provided which is adapted to be secured in position in any suitable manner. The side wall 14 is rabbeted, as shown at 21, in Fig. 2 for receiving the beveled edge of the closure. After the closure is placed in position, the lower edge of the wall 14 is pressed or hammered into contact with the beveled edge of said closure for retaining the closure in position as shown in Fig. 3.

The upper base or head 12 comprises a circular hollow body portion 22 which is surrounded by the supporting spring and is adapted to position said spring.

The body portion 22 is reduced as at 23 to form the annular shoulder 24 which is adapted to engage the friction casing or thrust member 25 for operating the friction mechanism when the unit is compressed beyond a predetermined amount as will presently appear.

Suitable means are provided for frictionally resisting the compression of the gear. A system of friction wedges is employed for this purpose. As shown, the system of wedges comprises a pair of substantially semi-circular wedge members 26 and 27 which are adapted to seat on the closure plate 19. These members are provided on their inner or straight sides with the oppositely arranged inclined surfaces 28 and 29 which are engaged by the inclined faces 31 and 32, respectively, of the center wedge member 33. The wedge member 33 has its upper portion reduced to form the hub 34 which is adapted to enter the bore 35 of the friction casing or thrust member 25 when the unit is compressed.

The outer or curved portions of the semi-circular wedges 26 and 27 are provided with inclined or wedging surfaces 36 and 37, respectively, which are adapted to be engaged by corresponding wedging surfaces 38 and 39 on the inner periphery of the thrust member or friction casing 25.

The thrust member or friction casing 25 is provided with a cylindrical body portion 41 which is of slightly less diameter than the internal diameter of the supporting spring 16 and extends upwardly through an axial opening in the wall 15 into said spring. The lower portion of the casing is enlarged to form the shoulder 43 for engaging the wall 15 for limiting the upward movement of said casing. The enlarged portion of the casing is provided with the inclined surfaces 38 and 39.

The cooperating inclined surfaces on the wedges and casing are so constructed that there is no binding action when the surfaces slide upon each other in compressing the gear. These surfaces are not conical; they are what may be termed cylindrical wedging surfaces. This is accomplished by making the upper and lower portions of the curved wedging surface of the same curvature. In other words, the upper and lower portions of the wedging surface form curves having radii of the same length. As for instance in Fig. 8, the focal point of the curve 20 formed by the lower marginal edge of the inclined surface 36 may be considered as being at the point A, while the focal point of the curve 30 formed by the upper marginal edge of the inclined surface 36 will be at the point B.

The thrust member or friction casing 25 is positioned by the reduced portion 23 of the head 12 which extends through an axial opening 44 in body portion 41 of said casing.

A combined friction and release spring 45 is mounted in the body portion 41 of the thrust member or friction casing 25, one end of which engages the upper wall of said body portion and the other the central wedge member 33 for resisting the upward movement of said member when the shoulder 24 engages the thrust member 25 upon compression of the unit, and for releasing the wedging means upon release of the compression.

The parts are held in assembled relation by a bolt 46 which extends through axial openings in the reduced portion 23, the wedge 33, and the plate closure 19. The head 12 is provided with an opening 47 through which access may be had to said bolt for attaching the nut 48.

In assembling the device, the plate 19 being removed, the thrust member 25 is inserted after which the spring 45 and wedge elements are inserted and the plate 19 applied. The spring 16 and head 12 are then assembled and the bolt 46 applied. The bolt 46 holds the parts assembled before the unit is applied, as during shipment and in handling the device. This bolt will also hold the spring 16 under initial compression.

During operation, the supporting spring will normally support the load, but upon further compression the shoulder 24 will engage the upper end of the thrust member 25 and force the same down against the compression of the spring 45. As the thrust member moves down, the inclined or wedging surfaces of this member will force the wedge members 26 and 27 inward which in turn will cause the central wedge member 33 to be forced upward against the compression of the spring 45. The moving of the wedging surfaces upon each other and the friction between the plate 19 and the bottom of the wedges 26 and 27 will absorb the energy of the downwardly moving load. There will be an increasing resistance to the downward movement of the head 12 due to the increased resistance of the two springs and more especially of the inner spring.

The downward movement of the thrust member 25 causes an upward movement of the central wedge 33. Consequently, the spring 45 being compressed simultaneously from both ends, its resistance rapidly increases. As the resistance of the spring 45 increases, the friction of the wedging elements also increases, all of which tends to prevent undue vertical vibration of the car.

Upon release, that is upon upward movement of the car after compressing the unit, the spring 45 will tend to elevate the thrust member directly and will also tend to elevate it through its action on the wedging members by its engagement with the wedge 33.

The absorber unit is of substantially the same dimensions as the present bolster supporting car spring and may be substituted therefor. Since the unit has circular bases and is of the same height as the conventional car springs, the same may be readily substituted for any one or more of the springs in any group or assembly.

In the use of the unit, it is usually not necessary to substitute one of these units for each car spring in any given group.

These units have very high capacities and usually one or two are sufficient for each group of springs. They are preferably symmetrically arranged in the group as for instance where the group of springs for supporting one end of the bolster comprises five springs, arranged in a square with one in the center, one of the units may be substituted for the central spring or two units may be substituted for the two springs at the diagonally opposite corners, or three units may be substituted for the three springs on either one or the other of the diagonals so that there will be no tedency to twist or turn the bolster when the units are compressed to operate the shock absorbing means.

I claim as my invention:

1. A cushioning unit comprising, in combination, a pair of heads, one thereof being chambered, a helical spring reacting between the heads, a system of wedges inclosed within the chambered head, a hollow stem projecting from certain of the wedge elements into the chamber of the helical spring and engageable by the opposed head after partial compression of said spring, and a spring interposed between the end of the stem and other of the wedging elements.

2. In a shock absorbing unit, a base member, a head member, a spring between said members, said base member being in the form of a housing having an opening through its upper wall, a pair of wedge members each having a wedging face on its inner surface and a cylindrical wedging face on its outer surface, a hollow friction casing having a stem portion extending through said opening and an enlarged body portion provided with interior cylindrical wedging surfaces for engaging the outer wedging surfaces of said wedge members, a wedge block for engaging the inner wedging faces of said wedge members, a spring between said block and the upper inner wall of said casing, and a cylindrical extension on said head terminating in a reduced end extending through an opening in said casing, said reduced end forming a shoulder on said extension for engaging said casing when said first named spring has been compressed beyond a predetermined amount.

3. In a shock absorber unit, a hollow base member having an opening through its upper wall, a head member comprising a cylindrical body portion having a flange around its upper end and provided with a reduced portion forming a shoulder on said body portion, a spring between said flange and said base member, a pair of friction elements having wedging faces on their inner and outer surfaces, a hollow friction casing having interior wedging faces for engaging said elements, a central wedge block frictionally engaging said elements, and a spring for resiliently resisting the upward movement of said block, the reduced portion of said head extending through an opening in the upper end of said casing whereby when said unit is compressed a predetermined amount said shoulder will engage the upper end of said casing for compressing said friction elements.

4. In a shock absorbing unit, a hollow base member, a head member comprising a cylindrical body portion provided with a downwardly extending projection forming a shoulder on said body portion, friction elements in said base member, a hollow thrust member having an enlarged lower portion provided with interior friction surfaces for frictionally engaging said elements and provided with an upward cylindrical extension having an axial opening therein for receiving the downwardly extending projection of said head member, a spring engaging one of said elements and said thrust member for resisting the approach of said last named element and thrust member toward each other, and a spring surrounding the cylindrical portion of said head member and the upper end of said thrust member for normally resiliently supporting said head member from said base member.

5. In a cushioning unit, a chambered follower, an opposed follower, a spring interposed between the followers, a system of wedging elements enclosed within the chambered follower, one of such elements having a stem projecting from the follower chamber, a spring reacting between shoulders on the stem and other of the wedge elements and means on the opposed follower for engaging the stem after the first named spring is partially compressed.

CHARLES J. NASH.